United States Patent [19]

Emrie

[11] 4,331,542
[45] May 25, 1982

[54] UNDERDRAIN UNIT WITH AIR/WATER BACKWASH FOR GRANULAR FILTRATION SYSTEM

[75] Inventor: Robert E. Emrie, Austin, Tex.

[73] Assignee: Enviroquip, Inc., Austin, Tex.

[21] Appl. No.: 174,716

[22] Filed: Aug. 1, 1980

[51] Int. Cl.³ .............................................. B01D 23/24
[52] U.S. Cl. .................................. 210/794; 210/274; 210/275; 210/289; 210/293
[58] Field of Search ............... 210/794, 795, 274, 275, 210/279, 289, 291, 293

[56] References Cited

U.S. PATENT DOCUMENTS

| | | | |
|---|---|---|---|
| 1,069,737 | 8/1913 | Stevenson | 210/794 |
| 1,871,122 | 8/1932 | Kretzschmar | 210/274 |
| 2,767,852 | 10/1956 | Ellila | 210/171 |
| 3,613,888 | 10/1971 | Harris | 210/794 |
| 3,831,761 | 8/1974 | Chantereau | 210/274 |
| 3,956,134 | 5/1976 | Sturgill | 210/275 |
| 4,064,050 | 12/1977 | Heaney et al. | 210/293 |
| 4,118,322 | 10/1978 | San Roman | 210/275 |

Primary Examiner—Ivars C. Cintins
Attorney, Agent, or Firm—Arnold, White & Durkee

[57] ABSTRACT

A self-supporting underdrain unit to be placed upon the substantially horizontal floor of a filter tank to provide a liquid filtration system is disclosed. The self-supporting underdrain unit provides separately controllable fluid and exhaust gas header systems for backwashing. The exhaust gas and backwashing fluid are mixed in a turbulent mixing zone to provide superior backwashing and cleansing action.

10 Claims, 3 Drawing Figures

UNDERDRAIN UNIT WITH AIR/WATER BACKWASH FOR GRANULAR FILTRATION SYSTEM

BACKGROUND OF THE INVENTION

1. Field of the Invention

This invention relates generally to an underdrain for use with a granular filtration device. More particularly, an underdrain providing both air and water backwash systems is disclosed.

2. Description of the Prior Art

High rate gravity filters are generally comprised of a filter bed of particulate filter media of varying sizes. The liquid is filtered by downward flow through this filter media and exits the filtration tank through openings in an underdrain supporting the filter media. The filter media usually comprises layers of gravel of various sizes, beginning with the coarsest at the bottom near the underdrain and gradually decreasing in size until the finest gravel or sand is reached at the top of the filter bed. The filter bed may be covered with finely granulated anthracite coal.

Such gravity filters are generally cleaned by backwashing. During this process water or a combination of air and water is passed through the filter bed in a direction opposite to the fluid flow during filtration. It is desirable that the backwashing fluids, water and optionally air, be distributed evenly throughout the filtration tank. Many systems have been devised to attain this distribution of water and air during the backwash process. Examples include those systems described in U.S. Pat. Nos. 3,956,134, 4,064,050 and 4,118,322.

Although U.S. Pat. No. 3,956,134 appears to provide a self-supporting underdrain, it also appears to contemplate the introduction of only a single backwash fluid. U.S. Pat. No. 4,064,050 appears to contemplate the use of both water and air as backwashing fluids, but contemplates their entrance into the filtration tank through the same exhaust ports. Although also contemplating the use of both water and air as backwashing fluids, U.S. Pat. No. 4,118,322, still provides for their entrance into the filtration tank through the same ports.

The prior art backwashing underdrain devices suffer from the disadvantage of providing for backwash with either water or air as the backwashing fluid, but fail to provide separately controllable systems where both fluids may be used simultaneously. Further, many of the prior art systems were expensive to construct, requiring both elaborate piping systems and support for the underdrain itself.

SUMMARY OF THE INVENTION

The present invention overcomes the disadvantages of the prior art mentioned above by providing a self-supporting underdrain comprised of individual replaceable, longitudinal ribs. The underdrain also features individually controllable headers for the introduction of backwash water and air.

The apparatus comprises a self-supporting underdrain unit for a liquid filtration system to be placed upon a substantially horizontal floor of a conventional filtration tank. The underdrain unit comprises a plurality of convex longitudinal ribs placed parallel to one another. These ribs are self-supporting and together with the floor form a corrugated surface. This surface defines a plurality of inner chambers between the floor and the raised portions of the ribs. The sides of these ribs are perforated with a plurality of holes permitting the passage of a fluid between the longitudinal inner chambers and the upper portions of the filtration tank. A means for conducting the filtered fluid out of each inner chamber is provided. In larger units a central gullet in the horizontal floor may provide this means. A flat bottom with fluid passage means extending through a wall of the filter tank and into the inner chambers is preferred in smaller units.

A controlled backwash liquid header system in fluid commuication with each of the longitudinal inner chambers is provided. This liquid header system conducts liquid to each of the longitudinal inner chambers during backwashing. This system may be provided simply by backwashing through the gullet or fluid passage means discussed above or may be provided by a separate header system.

A controlled backwash gas header system is also provided. This system comprises a plurality of exhaust gas outlets located on the horizontal floor of the filter tank. These outlets exhaust gas into the filtration tank during backwashing.

The above self-supporting underdrain unit may be combined with a conventional filtration tank having a substantially horizontal floor and a means for admitting unfiltered fluid to provide a filter and backwashing system for a liquid filtration system.

The filter and backwashing system provided by the self-supporting underdrain unit of the present invention provides a means for performing a backwashing process wherein both liquid and gas backwashing may be employed simultaneously. This process involves the separate control of backwashing liquid and gas. In the preferred embodiment, the backwashing gas, preferably compressed air, enters the filtration compartment below the location where the backwashing liquid enters the tank. The turbulent mixing of the backwashing fluid with the backwashing gas in the valleys between the individual ribs of the underdrain unit provides a superior backwashing system.

This self-supporting underdrain unit and the filtration and backwash system employing this unit constructed in the manner described above have several advantages. Economic advantages arise because the underdrain unit is self-supporting and the ribs of the underdrain unit are individually replaceable. Many operational advantages are attainable. The system provides separate controls for the flow of the backwash liquid and gas employed during backwashing. The backwash liquid and gas may be directed into the same zone for mixing. The backwash gas may be injected below the backwash water in this zone. The shape of the mixing zone between the individual ribs of the underdrain unit creates a uniform turbulent mixing.

These and other meritorious features and advantages for the present invention will be more fully appreciated from the following detailed description and claims. dr

DESCRIPTION OF THE PREFERRED EMBODIMENT

Figure 1:
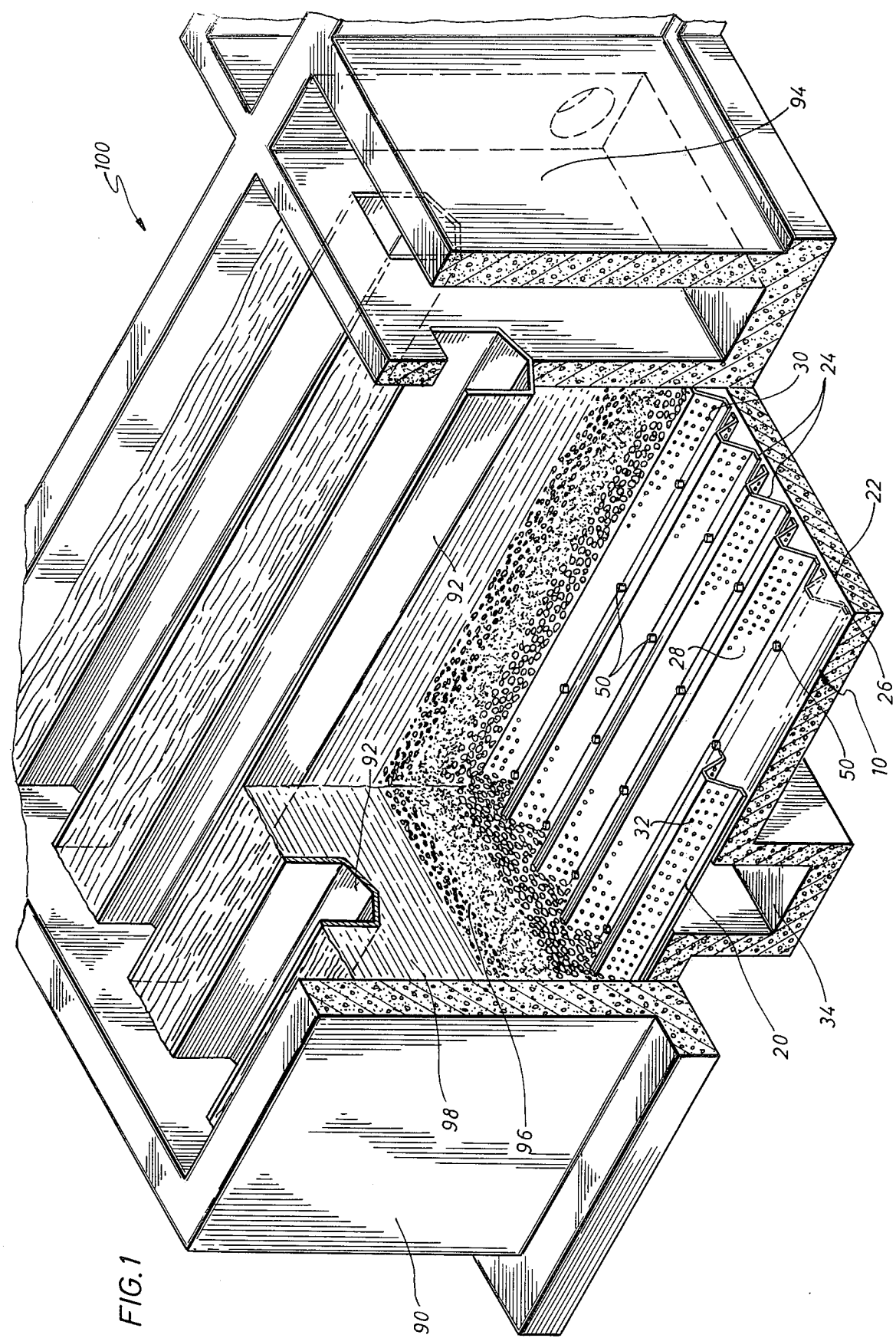
FIG. 1 is a perspective view of a filter and backwashing system incorporating the self-supporting underdrain unit of the present invention.
Figure 2:
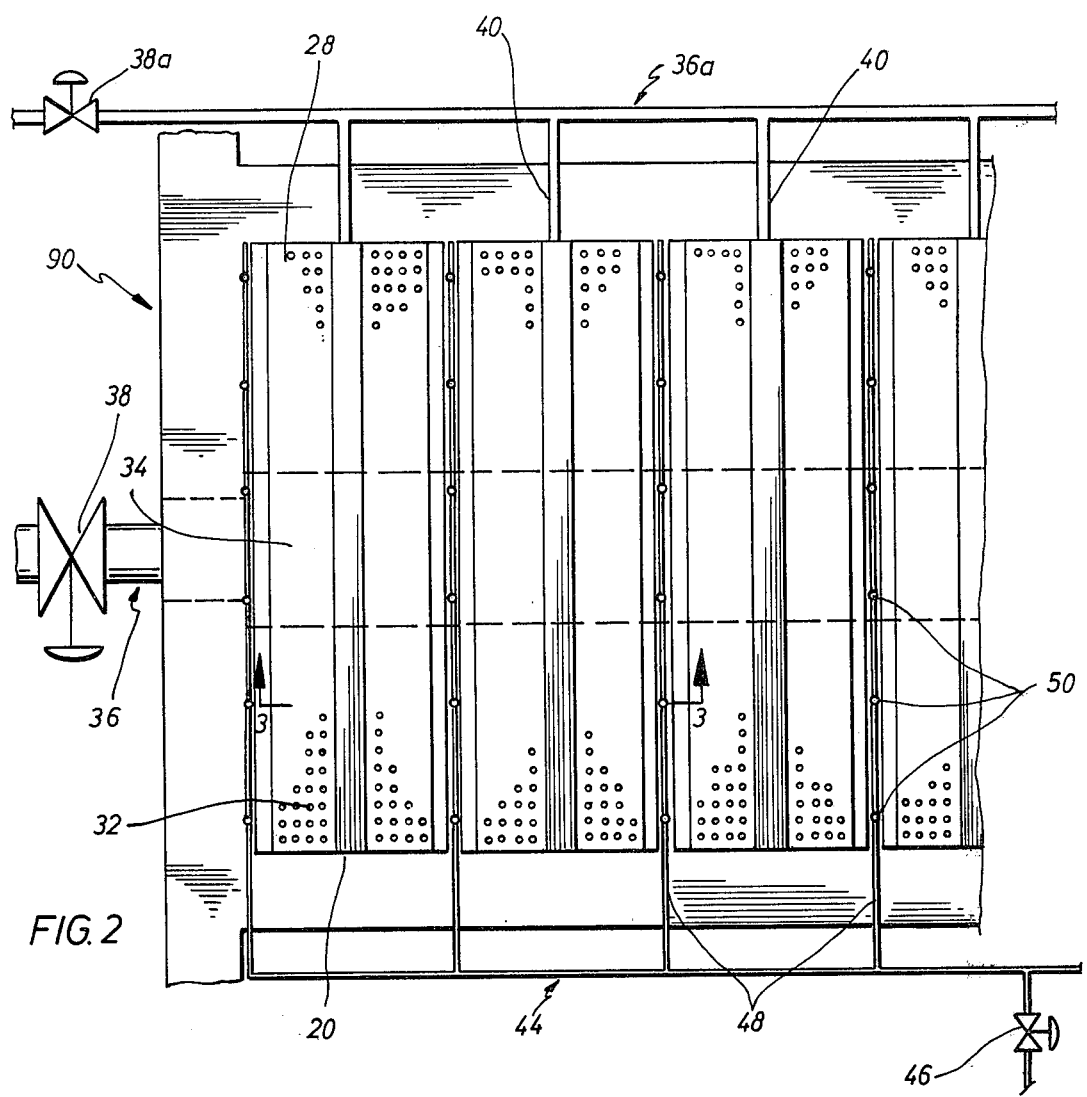
FIG. 2 is a top view of the self-supporting underdrain unit.
Figure 3:
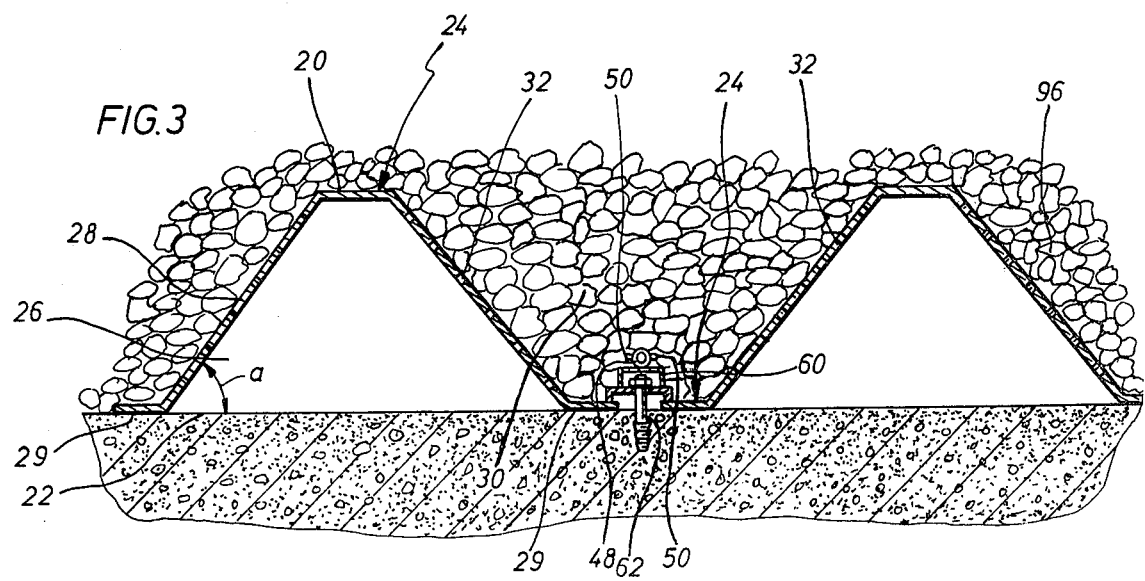
FIG. 3 is a cross-sectional view of the self-supporting underdrain unit.

The self-supporting underdrain unit 10 of a liquid filtration system 100 comprises a plurality of convex longitudinal ribs 20 which together with the substantially horizontal floor 22 of tank 90 form a corrugated surface 24. A plurality of inner chambers 26 are formed between floor 22 and ribs 20.

In the preferred embodiment the interior angle (a) between the sides 28 of convex longitudinal ribs 20 and horizontal floor 22 of tank 90 is between about 30° and about 60°. The distance between centers of adjacent longitudinal ribs 20 is between about 1 foot and about 3 feet, preferably between about 1½ feet and about 2 feet. The height of the top of longitudinal ribs 20 above horizontal floor 22 is between about 6 inches and about 12 inches, preferably between about 7 inches and about 10 inches. Longitudinal ribs 20 may be constructed by any appropriate material, e.g., 12 gauge steel, such as stainless steel.

The lower sides of ribs 20 may comprise flanges 29 which are at an angle to sides 28 such that flanges 29 may rest flat on floor 22. In one embodiment, ribs 20 are secured to floor 22 by channels 60 which are anchored in floor 22 by cinch anchors 62.

A plurality of discharge holes 32 are located along the sides of ribs 20. Holes 32 may be of any appropriate size, constrained only by the desired flow rate and the size of the lowest filter media. In the preferred embodiment 5/32 inch diameter holes are placed in a square or diamond array in sides 28 of ribs 20. These holes are separated in the array by approximately 1⅛ inches. Although holes 32 may be placed over the entire surface of ribs 20, in the preferred embodiment holes 32 are found only along the sides 28 of ribs 20.

Self-supporting underdrain unit 10 further comprises a means for conducting filtered fluid out of each inner chamber 26. In larger units a gullet 34 is the preferred means. Gullet 34 may run the length of tank 90 passing under each of ribs 20 and inner chambers 26. In the preferred embodiment gullet 34 passes down the middle of tank 90 perpendicular to ribs 20. This gullet may be placed in many other positions. Alternatively, means may be provided at the ends of inner chambers 26 for conducting the filtered fluid out of each chamber and through the wall of tank 90 to a collection trough or gullet 34 outside the tank. This alternative is especially favored for small units where the need to dig a gullet under the tank may be eliminated.

Self-supporting underdrain unit 10 further comprises a controlled backwash liquid header system 36 in fluid communication with each of longitudinal inner chambers 26. This liquid header system 36 conducts liquid to each longitudinal inner chamber 26 during backwashing.

In the preferred embodiment of the present invention, the liquid header system 36 may be provided simply by a control means 38, e.g., a valve, to discharge the backwashing liquid directly into gullet 34 from which it is distributed to individual longitudinal inner chambers 26.

In another embodiment liquid header system 36a comprises a control means 38a, e.g., a valve, in fluid communication with a series of distribution pipes 40 which carry the backwashing liquid to longitudinal inner chambers 26.

The backwash fluid is vented from longitudinal inner chambers 26 through discharge holes 32 into filter compartment 98.

Underdrain unit 10 further comprises a controlled backwash gas header system 44. Gas header system 44 comprises a backwash gas control means 46, e.g., a valve, in fluid communication with distribution pipes 48 containing a plurality of exhaust gas outlets 50. Pipes 48 may be supported in channels 60. In the preferred embodiment exhaust gas outlets 50 are evenly spaced along the floor of tank 90 in the valleys 30 created by adjacent ribs 20. In the preferred embodiment exhaust gas outlets 50 are positioned below backwash liquid outlets 32 to provide a turbulent mixing zone located in valleys 30 formed by adjacent ribs 20.

A filter and backwashing system 100 incorporating the above described self-supporting underdrain unit 10 may be constructed in a standard filtration tank 90 having a substantially horizontal floor 22. Generally filtration tank 90 is constructed of concrete and is provided with backwash troughs 92 leading to waste through 94. Filter media 96 generally comprise gravel, sand and anthracite. In a typical filter the largest diameter gravel is placed on the bottom in contact with underdrain unit 10 while successive layers of smaller diameter gravel are placed thereon. The top layers of such a filter comprise sand and/or finely ground anthracite.

In the process of backwashing a liquid filtration system 100 constructed with underdrain unit 10 of the present invention, a backwashing liquid, such as filtered water, enters the filter compartment 98 through holes 32 in ribs 20 of underdrain unit 10. A separately controllable backwash gas is exhausted into filter compartment 98 through exhaust gas outlets 50, preferably simultaneously with discharge of the backwashing liquid into filter compartment 98. This simultaneous backwashing with liquid and gas, preferably filtered water and compressed air, creates a turbulent mixing zone in valleys 30 formed between adjacent longitudinal ribs 20. This turbulent mixing produces a superior backwashing and cleansing effect on filter media 96.

While the above has illustrated what is now contemplated to be the best mode of carrying out the invention, the apparatus and process of the present invention is subject to modification without departing from the spirit and scope of the invention. For example, many means of providing separately controllable fluid and exhaust gas header systems are available. Therefore, the invention is not restricted to the particular form of construction illustrated and described, but covers all modifications which may fall within the scope of the following claims. It is applicant's intention in the following claims to cover such modifications and variations as fall within the true spirit and scope of the invention.

What is claimed is:

1. A self-supporting underdrain unit for a liquid filtration system to be placed upon a substantially horizontal floor of a filtration tank, said underdrain unit comprising:
   (a) a plurality of convex longitudinal ribs placed parallel to one another, said ribs together with the floor forming a corrugated surface and defining a plurality of inner chambers between said floor and said ribs and a plurality of valleys between said ribs, said ribs each having a plurality of holes in the sides thereof permitting passage of a fluid between the longitudinal inner chambers and the upper portions of the tank;

(b) a controlled backwash liquid header system in fluid communication with each of said longitudinal inner chambers, said liquid header system to conduct backwash liquid to each longitudinal inner chamber during backwashing; and (c) a controlled backwash gas header system, comprising a plurality of exhaust gas outlets in fluid communication with a controlled gas distribution system, said outlets located on said horizontal floor for exhausting gas into said valleys between said ribs during backwashing, said header systems being separately controllable and positioned to produce turbulent mixing of said backwash liquid and said backwash gas in said valleys between said ribs.

2. The underdrain unit according to claim 1, further including means for conducting filtered water out of each inner chamber, comprising a liquid outlet conduit in fluid communication with each of said longitudinal inner chambers.

3. The underdrain unit according to claim 1, wherein said exhaust gas outlets are located in the valleys formed between adjacent longitudinal ribs.

4. The underdrain unit according to claim 3, wherein the backwash gas is exhausted at a point below said plurality of holes in said longitudinal ribs.

5. The underdrain unit according to claim 4, wherein said holes on adjacent longitudinal ribs and said exhaust gas outlets are positioned such that fluid and gas exhausting from said holes and outlets during backwashing mixes in a mixing zone located in the valleys between adjacent longitudinal ribs.

6. The underdrain unit according to claim 1, wherein the interior angle between the sides of said longitudinal ribs and the horizontal floor of said tank is between about 30° and about 60°.

7. A filtration and backwashing system for a liquid filtration system, comprising:

(a) a filtration tank having a substantially horizontal floor;

(b) a means for admitting unfiltered liquid into said tank;

(c) a plurality of convex longitudinal ribs placed parallel to one another, said ribs together with said floor forming a corrugated surface defining a plurality of inner chambers between said floor and said ribs and a plurality of valleys between said ribs;

(d) a plurality of holes through the sides of said ribs, said holes permitting the passage of a fluid between the longitudinal inner chambers and the upper portions of the tank;

(e) a means for conducting filtered liquid out of each inner chamber and out of said tank;

(f) a controlled backwash liquid header system in fluid communication with each of said longitudinal inner chambers, said liquid header system to conduct liquid to each longitudinal inner chamber during backwashing; and (g) a controlled backwash gas header system, comprising a plurality of exhaust gas outlets in fluid communication with a controlled gas distribution system, said outlets located on said horizontal floor for exhausting gas into said valleys between said ribs during backwashing, said header systems being separately controllable and positioned to produce turbulent mixing of said backwash liquid and said backwash gas in said valleys between said ribs.

8. The filtration and backwashing system according to claim 7, wherein said exhaust gas outlets are located in the valleys formed between adjacent longitudinal ribs.

9. The filtration and backwashing system according to claim 8, wherein said backwash gas is exhausted at a point below said plurality of holes in said longitudinal ribs.

10. A process for backwashing a liquid filtration system comprising:

(a) backwashing with a liquid which is discharged into the filtration compartment from the ribs of an underdrain and whose flow is separately controllable; and (b) backwashing simultaneously with a gas which is separately exhausted into the filtration compartment from said underdrain at a point lower than where the liquid is discharged into the filtration compartment and whose flow is also separately controllable, to provide a turbulent mixing area for the backwashing liquid and gas in the valleys formed between the ribs of said underdrain unit.

* * * * *